Fig. 2.

INVENTORS
ROBERT A. BRYSON
RICHARD B. HAWKES

Kenyon & Kenyon
ATTORNEYS

United States Patent Office 3,399,755
Patented Sept. 3, 1968

3,399,755
MACHINE AND METHOD FOR TRANSFERRING AN ARTICLE FROM ONE APPARATUS TO ANOTHER
Robert A. Bryson and Richard B. Hawkes, Easton, Pa., assignors to T.W. & C.B. Sheridan Company, New York, N.Y., a corporation of New York
Continuation of application Ser. No. 428,787, Jan. 28, 1965. This application Aug. 28, 1967, Ser. No. 663,903
16 Claims. (Cl. 198—34)

ABSTRACT OF THE DISCLOSURE

The discloseure relates to a transfer machine which receives an article from an infeed conveyor and subsequently delivers the article to an outfeed conveyor in a predetermined phase relation therewith regardless of a change in phase between the infeed conveyor and the outfeed conveyor. In response to the degree of a lagging phase relationship between the infeed conveyor and the outfeed conveyor, the transfer machine accelerates the article for delivery to the outfeed conveyor in the predetermined phase relationship. In an embodiment of the disclosure the interacting lobes of a cam arrangement enable the drive of the transfer machine to be accelerated when the infeed conveyor lags the outfeed conveyor.

---

This application is a continuation of Ser. No. 428,787 filed Jan. 28, 1965 and now abandoned.

This invention relates to the transferring of an article from one apparatus to another and more in particular to the receiving of an article from one apparatus and the delivering of the article to another apparatus in a predetermined phase relationship therewith.

In production machinery, it is common practice to process an article by advancing it through a plurality of stations at which various operations are performed. In many cases separate apparatus is provided for advancing the article through each station of the overall system in which each succeeding station must operate in synchronism with the station preceding it. As a result, upon being advanced to the next station, the article must be admitted to it in a predetermined phase relationship. A single conveying apparatus normally cannot be used for a complete system since it makes it impossible to establish or maintain the necessary predetermined phase relationship at each station. As a result in such production machinery there is often provided a plurality of conveying devices, each for one or more of the stations. With such an arrangement each of the plurality of conveying devices can be timed with the others in order to establish and maintain a predetermined phase relationship of the article being admitted to each of the stations.

Even with a plurality of conveying devices, however, there still remains the problem of establishing the proper synchronism between them. This problem is aggravated wherever it is necessary to periodically start and stop the machinery since it is normally only possible to establish a fine degree of synchronism when the machinery is operating in a steady-state condition. Thus during the start of the machine, following a shut down, the variables accompanying this transient condition can upset the synchronism of the machinery.

An example of a machine system in which an accurate degree of synchronism is required between the various stations occurs in the field of book-binding. Two stations of such systems which are adjacent to one another are the gatherer and the binder. In the gatherer there are a plurality of hoppers in which quantities of each signature are placed in consecutive order. The gatherer also includes a traveling conveyor or chain upon which are mounted a plurality of spaced pins. During operation the signatures are fed from the hoppers to in front of each of the pins, one after the other with the signatures piling on top of each other, in order to collate them as the chain advances and thereby ultimately produces a book pack or book. Consequently at the exit end of the gatherer, each pin advances a complete book composed of all the signatures with the signatures arranged in order. At this point the book is ready to be delivered to the binder where the backs of the folds are trimmed off, the edges roughened, and a coat of glue applied to form the bond between the pages. Instead of delivering the book to a perfect binder the gatherer may deliver the book to a stitcher where the signatures are sewed together. In any event, it is necessary that the gatherer deliver the groups of signatures or books in synchronism with the succeeding station of the overall machinery, that is the stitcher or perfect binder.

During jogging of the gathered signatures prior to stitching or the operation of a perfect binder, as well as during the starting up and stopping of the gathered, the gatherer may not be in synchronism with the succeeding machine. Thus for example the gatherer and binder are not necessarily moving at the same speed or are they necessarily in the proper predetermined phase relationship with one another. Because of this condition, in certain prior machines the gatherer and binder have been each manually controlled during jogging and starting up in order to establish a common speed and phase relationship between them, after which the machine operates continuously in phase. As a result, it is possible in the prior art machines to deliver books from the gatherers in a manner which is completely out of synchronism with the binder. Consequently, the operator must manually remove books which cannot be picked up by the conveyor of the binder. Without close manual supervision, a pileup of books can occur when attempting to synchronize the machines and bring them up to the normal operating speed.

In other prior art machines the gatherer and binder are restricted to start and stop only under predetermined conditions in order to maintain synchronism between them. In certain of these arrangements, commutation discs serve to electrically time the gatherer to the binder during starting. In addition, the use of stop signals requires that the machines be stopped in predetermined positions. Although such a system enables the start and stop positions to be controlled, books must be manually removed during jogging to prevent jamming. In addition by limiting the machines to predetermined start and stop positions, a degree of the versatility and the simplicity of operation is lost.

An additional factor which makes predetermined positions unsatisfactory is that during jogging, the gatherer chain having pins disposed at one interval for pushing books may be required to be stopped adjacent hoppers disposed at a different interval for delivering signatures. As a result, it is clearly preferable to be able to start and stop at random positions. It is also preferable to be able to start and stop at random positions without having books delivered by the gatherer conveyor at a time when they cannot be picked up by the binder conveyor.

It is therefore one of the objects of the invention to provide a device for receiving an article from a first apparatus adapted to advance the article and for delivering the article in a predetermined phase relationship to a second apparatus adapted to advance the article.

It is another object of the invention to provide a device for receiving groups of signatures or books from a gatherer and delivering them in proper phase relationship to a binder.

It is still another object of the invention to provide a machine for receiving an article moving at one speed and changing the speed of the article so that it can be delivered at another speed.

It is an additional object of the invention to provide a machine for accelerating and decelerating an article when moving the article from a first apparatus to a second apparatus in a predetermined phase relationship.

It is a further object of the invention to transfer an article from engagement with a first conveyor to engagement with a second conveyor at a predetermined phase relationship therewith.

It is also an object of the invention to provide a machine for transferring an article between two conveyors, not only when they are operating at different speeds but also when they are operating substantially in synchronism with one another. In addition, it is an object of the invention to provide a transfer machine disposed between a gatherer conveyor and binder conveyor and which is capable of transferring books therebetween during starting, stopping and steady-state operation without the inadvertent delivery of a book from the gatherer conveyor which is too late to be picked up by the binder conveyor.

In one embodiment of the invention there is provided means for conveying an article from a first advancing apparatus to a second advancing apparatus, each of which operates substantially independent of one another and each of which during its normal operating condition has a first predetermined phase relationship. The machine further includes means for admitting the article from the first advancing apparatus to the conveying means in a third predetermined phase relationship with the first advancing apparatus. Means are provided for driving the conveying means to convey the article toward the second advancing apparatus. In addition there is provided means responsive to a phase relationship between the first advancing apparatus and the second advancing apparatus which is different than the first predetermined phase relationship for varying the operation of the driving means. An advantage of this arrangement is that it enables the article to be delivered to the second advancing apparatus in a second predetermined phase relationship regardless of changes in the operation of each of the first and second advancing apparatus.

In another embodiment of the invention the means for admitting the article to the conveying means operates substantially in synchronism with the first advancing apparatus. With this arrangement the admitting of the article to the conveying means is maintained in a third predetermined phase relationship with the first advancing apparatus. As a result changes in the operation of the first advancing apparatus are reflected by changes in the admitting of the article to the conveying means.

In still another embodiment of the invention the means for driving the conveying means to convey the article toward the second advancing apparatus operates substantially in synchronism with the first advancing apparatus. As a result the condition of the article within the conveying means reflects the variation in the operation of the first advancing apparatus.

In an aditional embodiment of the invention, the machine includes cam means responsive to the phase relationship between the first advancing apparatus and the second advancing apparatus for accelerating and decelerating the operation of the driving means to enable the article to be delivered by the conveying means to the second advancing apparatus in a second predetermined phase relationship.

In a further embodiment of the invention the machine is adapted to receive a book from a gatherer and to deliver the book to a binder in a predetermined phase relationship.

Other objects may be inferred from the following disclosure of a specific example of a novel machine for transferring a book from a gatherer to a binder, said machine embodying the principles of this invention.

In the accompanying drawings:

FIG. 8 is a horizontal section view taken along the line 8—8 in FIG. 7 and showing the cam means for varying the operation of the driving means of the transfer machine;

Figure 1:
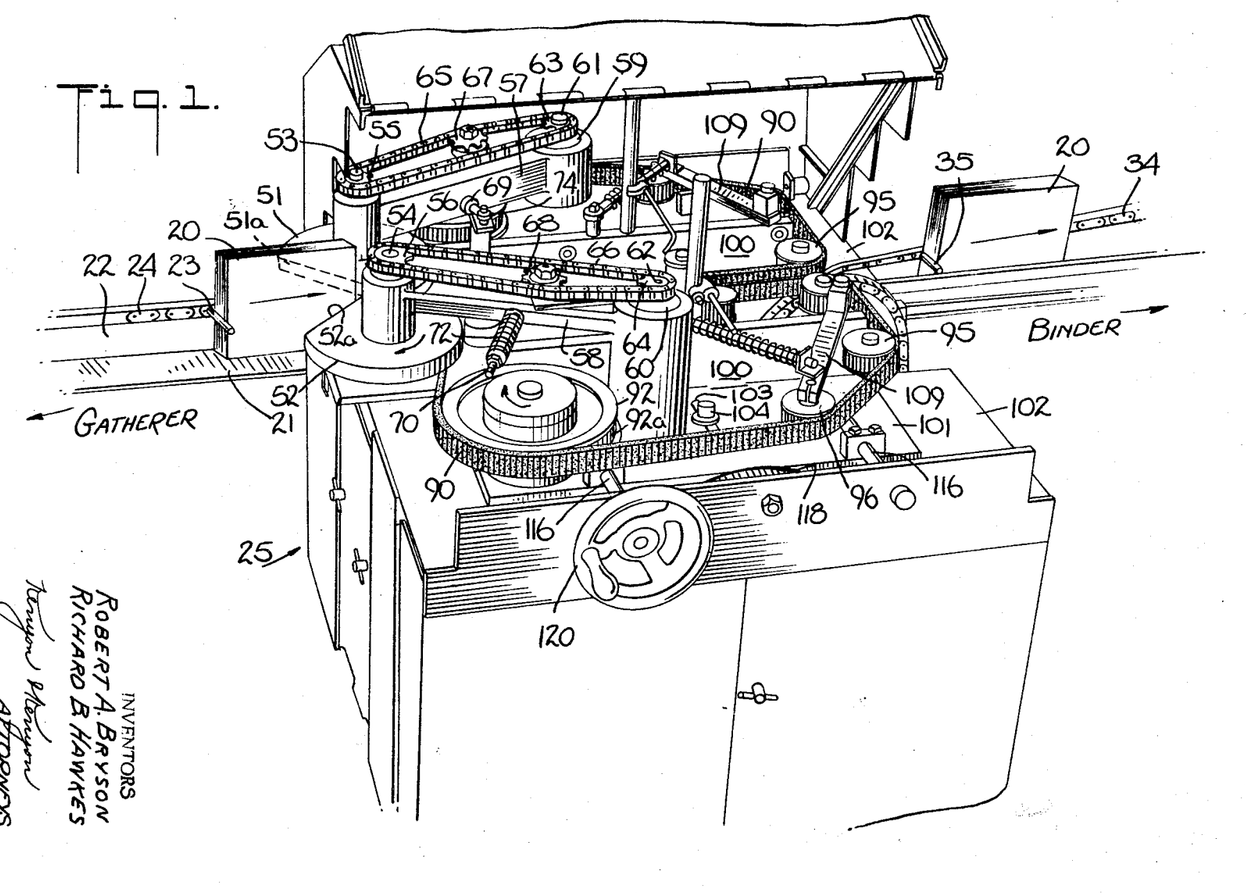
FIG. 1 is a perspective view of the admitting and conveying means of the transfer machine of the invention shown disposed between the conveyors of the gatherer and the binder.
Figure 2:
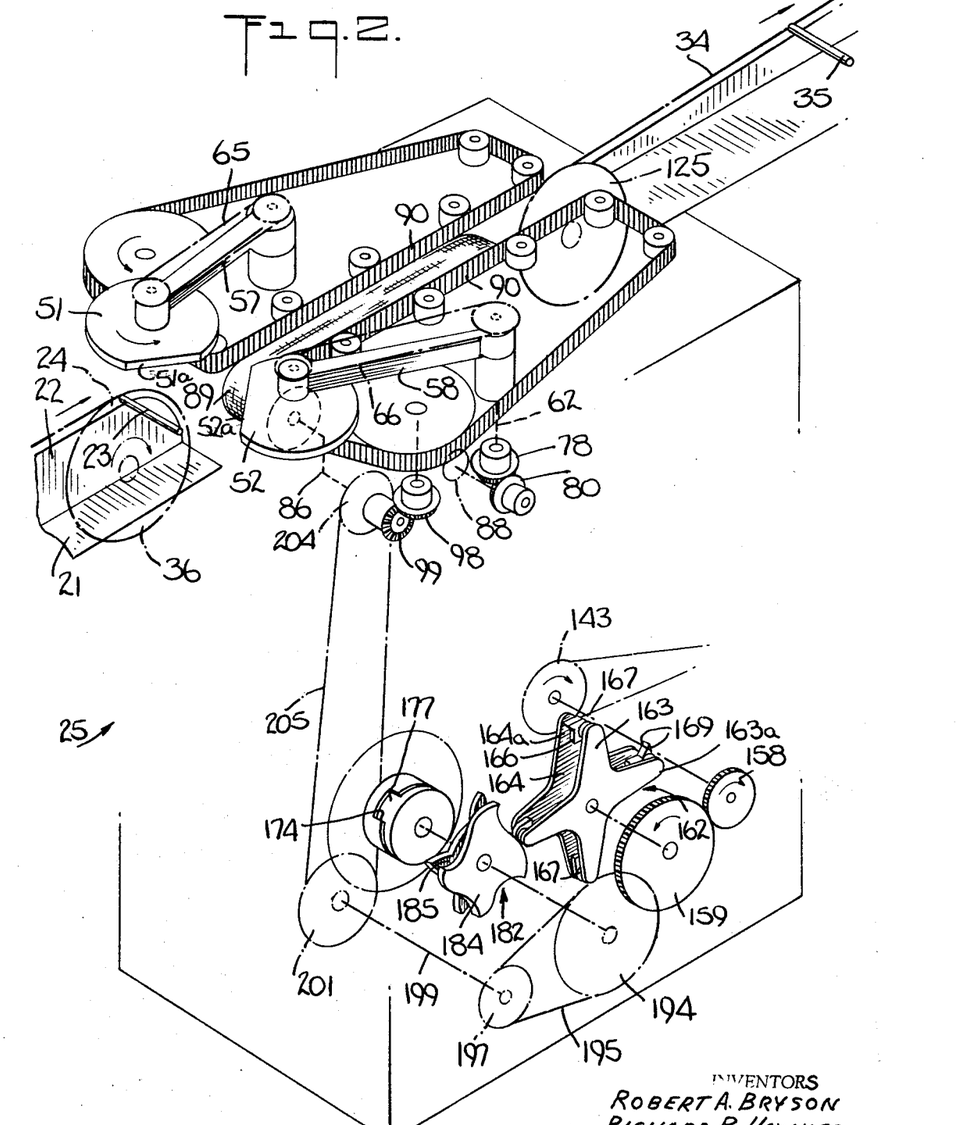
FIG. 2 is a schematic representation of the means for driving the conveying means to convey the article toward the binder, including the means for varying the operation of the driving means.

Book packs, groups of signatures, or books 20 are advanced along support plate 21 and adjacent to guide 22 by means of pins 23 engaged therewith (FIGS. 1 and 2). Thus pins 23 and conveyor chain 24 form a first apparatus adapted to advance the article or book signature. Chain 24 advances the signatures from a gatherer (not shown) where the signatures are selected from a plurality of hoppers and piled in front of pins 23 in order to collate the signatures into groups of signatures or books as chain 24 advances. Thus, as is shown in FIG. 1 of the drawings, a complete book composed of all the signatures, with the signatures arranged in order, is advanced into transfer machine 25 of the invention by chain 24.

Figures 13, 14:
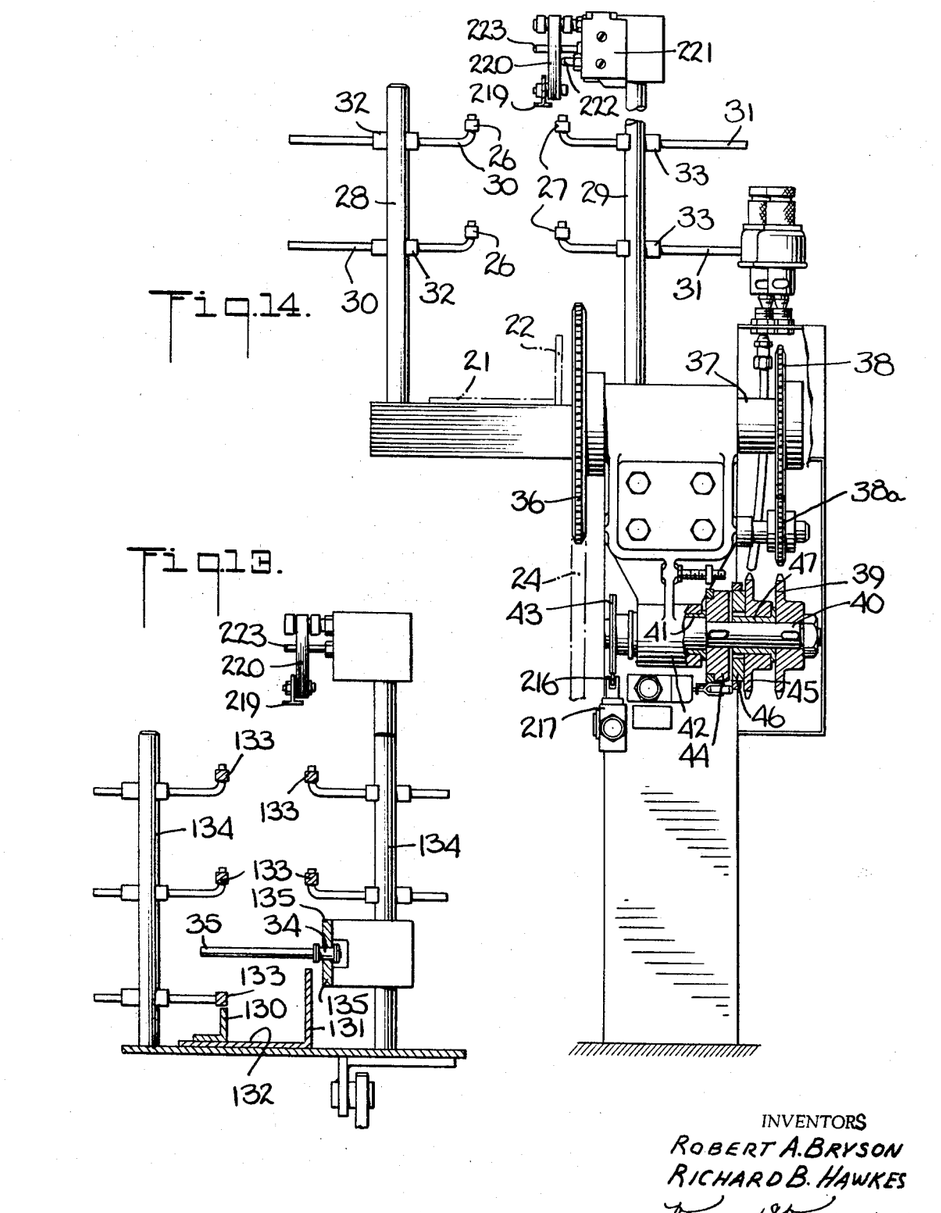
FIG. 13 is a vertical section view taken along the line 13—13 in FIG. 12 and showing the conveyor of the second advancing apparatus or binder.
FIG. 14 is a side elevation view of the first advancing apparatus when looking opposite to the direction of the advancing of the article toward the transfer machine.

As shown in FIG. 14 the groups of signatures are maintained in an upright position upon support plate 21 by siderails 26 and 27 which are supported by uprights 28 and 29, respectively. Siderails 26 and 27 are adjustably mounted upon the uprights by arms 30 and 31, respectively, which are adjustably positioned in blocks 32 and 33, respectively. Thus, the interval between the side rails can be adjusted to correspond to the thickness of the book which is to be advanced therebetween.

Transfer machine 25 receives the article or book from the first advancing apparatus, conveyor chain 24 of the gatherer, and delivers the book to a second apparatus, conveyor 34 of the binder, which is adapted to advance the book (FIGS. 1 and 2). Consequently, the transfer machine is adapted to move or transfer the books from gatherer chain pin 23 to chain pin 35 on infeed conveyor chain 34 of the binder. During jogging, starting up, and stopping of the gatherer, the gatherer and binder are not coupled to one another and consequently need not necessarily move at the same speed or be in a corresponding phase relationship with one another.

Figures 4, 5:
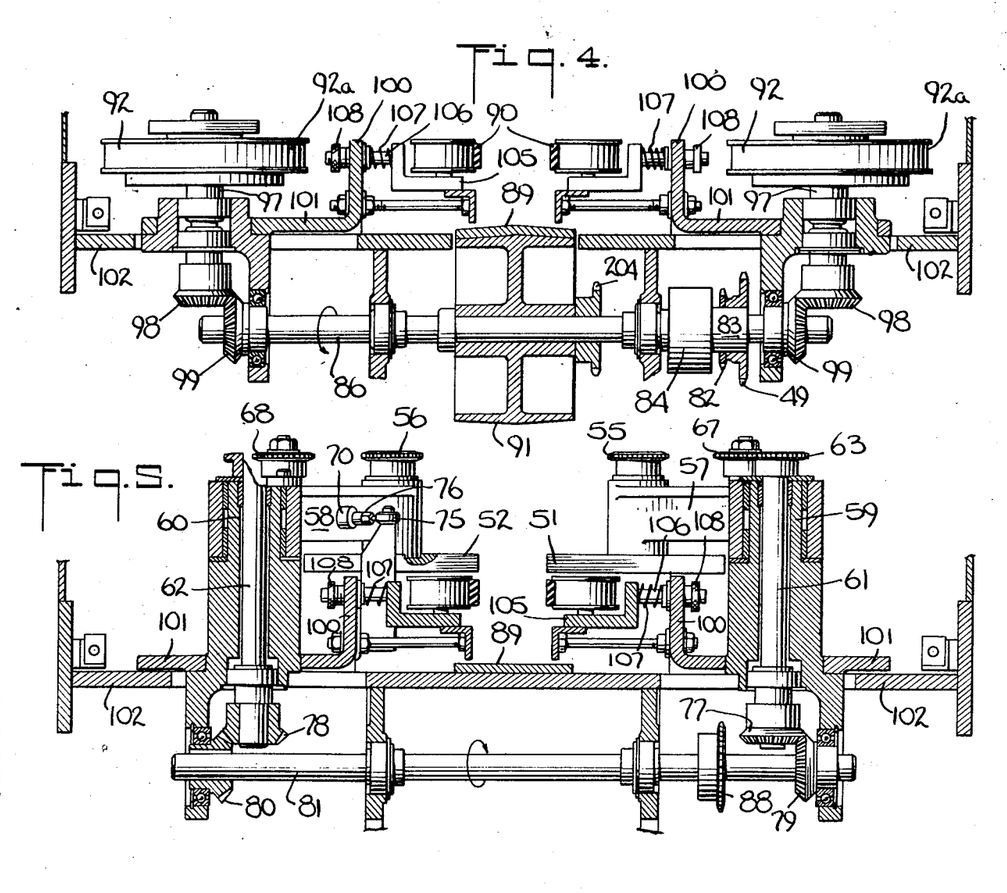
FIG. 4 is a vertical section view taken along the line 4—4 in FIG. 3 and showing the drive to the timing discs of the admitting means.
FIG. 5 is a vertical section view taken along the line 5—5 in FIG. 3 and showing the drive to the belts of the conveying means.
Figure 6:
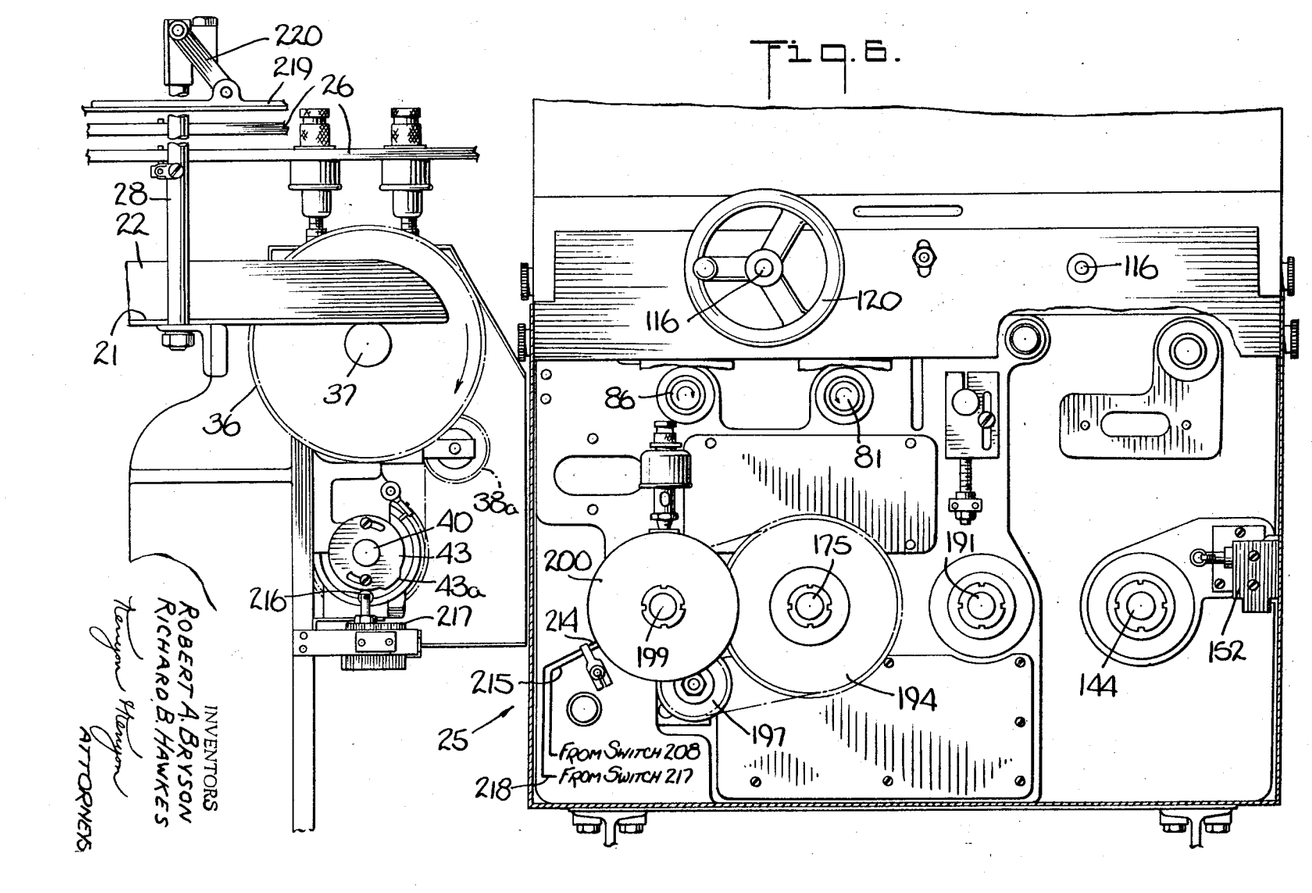
FIG. 6 is a front elevation view of the machine of the invention showing the conveyor of the gatherer adjacent to the entrance portion of the machine.
Figure 7:
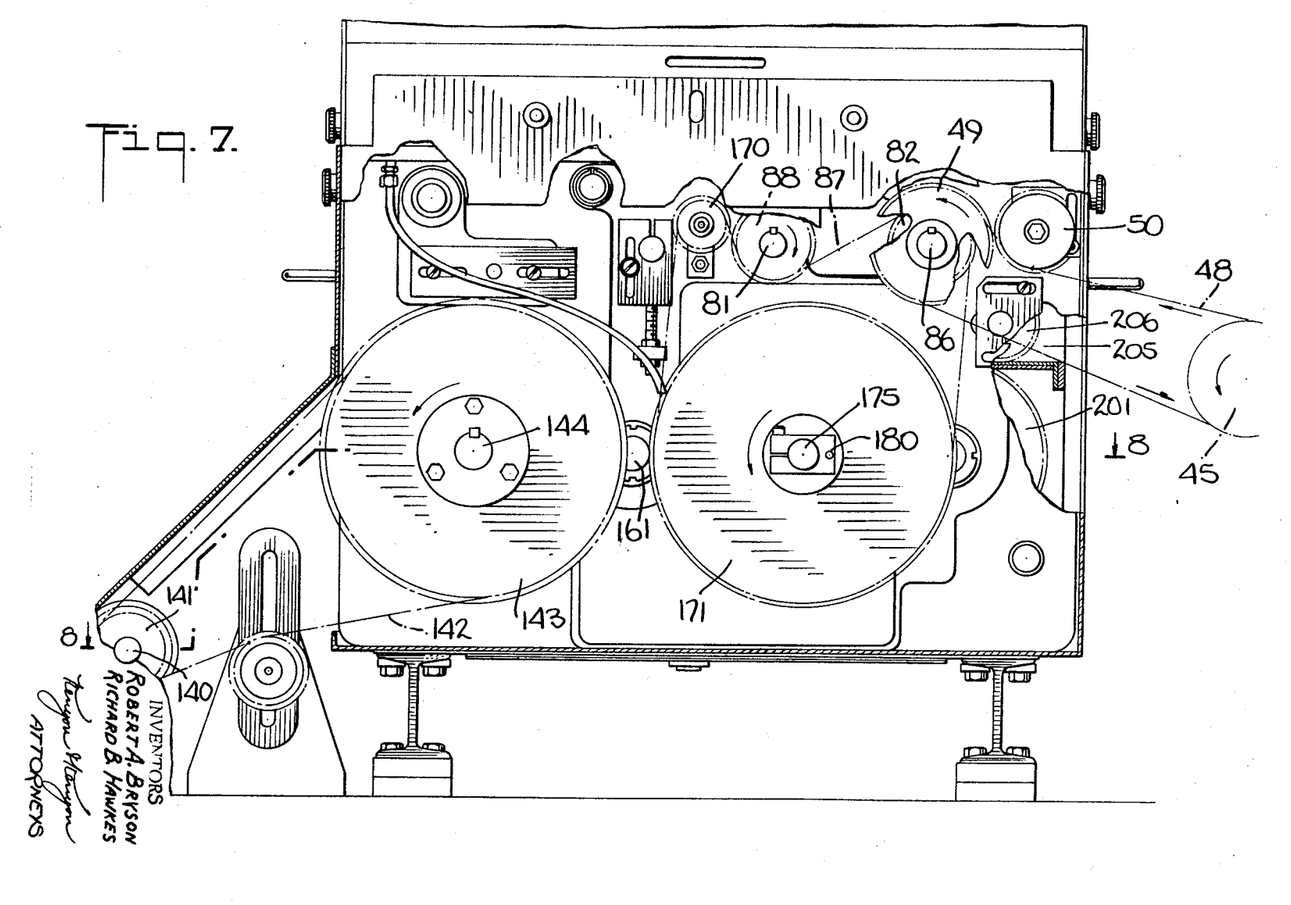
FIG. 7 is a rear elevation view showing the drives into the transfer machin from the binder and the gatherer.
Figure 9:
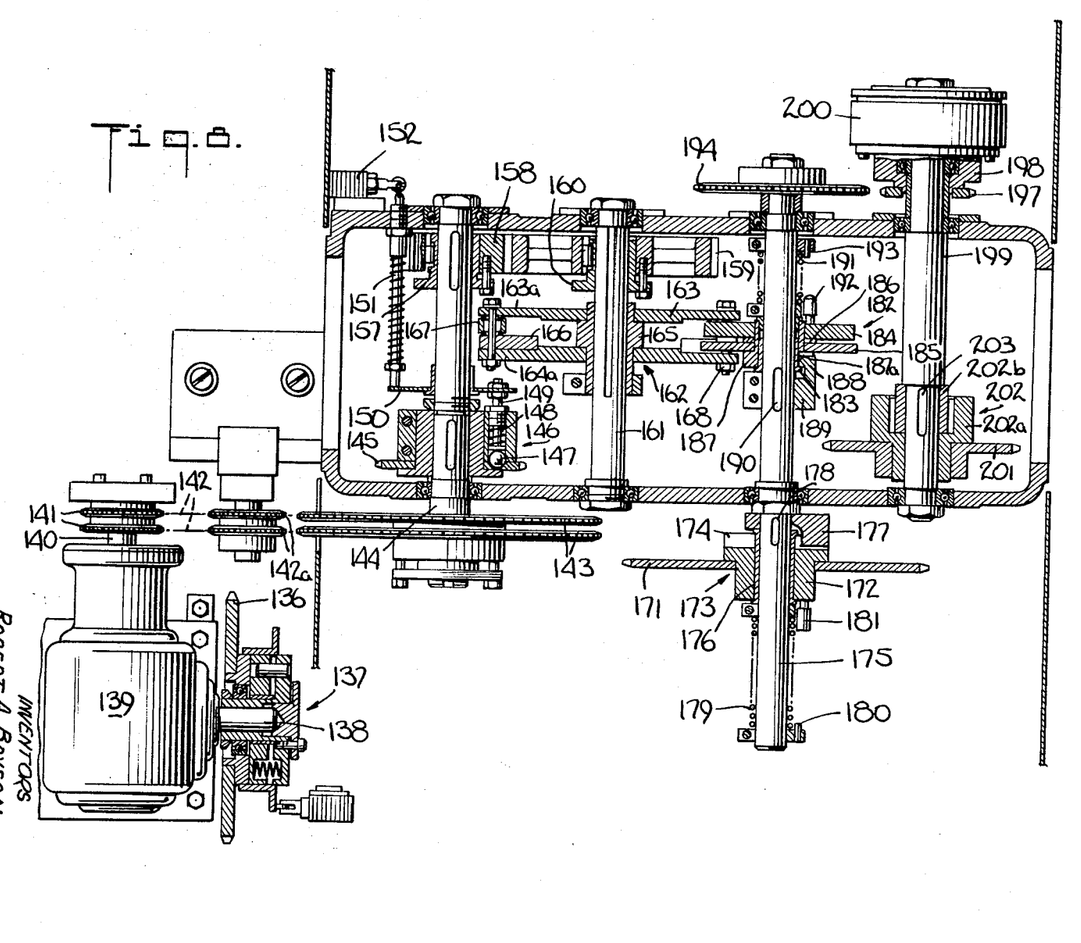
FIG. 9 is a vertical section view showing the cam and follower assemblies of the transfer machine about to engage when the first advancing apparatus is operating in a lagging phase relationship with that of the second advancing apparatus.

Gatherer chain 24 drives sprocket 36 which is attached to shaft 37 upon which sprocket 38 is mounted (FIG. 14). Sprocket 38 is coupled to sprocket 39, connected to shaft 40 by means of a roller chain (not shown), which passes over idler sprocket 38a (FIGS. 6 and 14). Shaft 40 which is supported by bushing 41 in frame member 42 has cam 43 connected to it (FIG. 14). In addition, electric clutch 44 is coupled to shaft 40 and when energized, engages sprocket 45 through clutch disc 46 so that the sprocket rotates with shaft 40. In the deenergized condition of clutch 44, the clutch disc ceases to engage sprocket 45 with respect to the clutch and therefore the sprocket mounted upon bushing 47 can rotate freely with respect to shaft 40. The input to transfer machine 25 from the gatherer includes drive chain 48 which is coupled to input sprocket 49 (FIGS. 4 and 9). Idler sprocket 50 serves to maintain proper tension in chain 48 during operation (FIG. 7). In this way an input drive or motion is delivered to the transfer machine and is maintained in synchronism with the drive of the gatherer.

Figure 3:
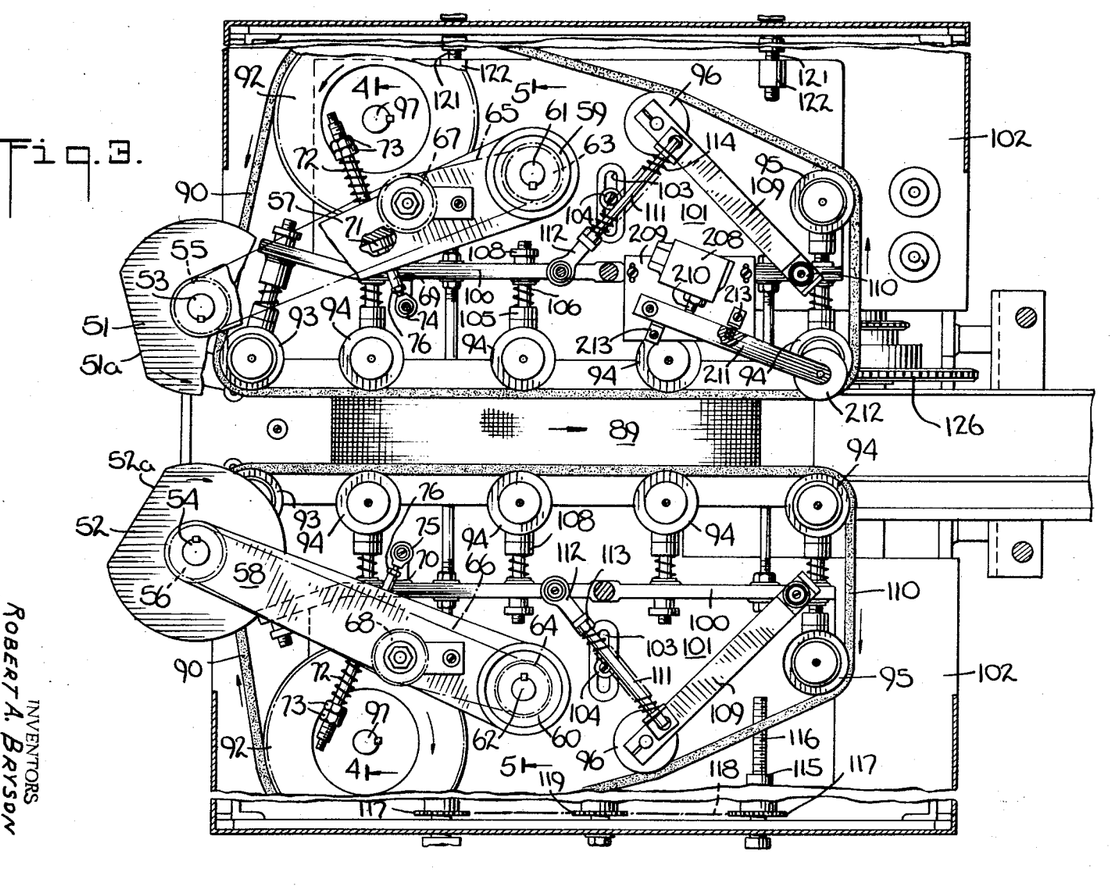
FIG. 3 is a plan view of the transfer machine showing both the admitting means and the conveying means for the article.

The means for admitting the article or book from the first advancing apparatus or gatherer chain to the conveying means of the transfer machine in a third predetermined phase relationship with the gatherer includes timing discs 51 and 52 (FIGS. 1–3). The discs are substantially round but each contains flat portion or relieved portion 51a and 52a, respectively. The spacing between the rounded portion of each of the discs substantially corresponds to the thickness of a book so that a book is frictionally engaged by each disc. As the discs rotate, they roll along the opposite surfaces of the book and advance it away from the gatherer chain. When the discs are rotated in the direction of the arrows in FIGS. 1–3 until a point is reached at which the flat portions are in a facing relationship, a parallel gap or passage is formed. If the discs are positioned apart from one another in a lateral direction with respect to the transfer machine so that the gap between the flat portions when they are in a facing relationship is as wide as the thickness of the book, the book can be advanced between the discs. Thus, the discs serve as gating elements which block a book engaged and being advanced by the rounded portion thereof from entrance into the transfer machine until a position is reached at which the flat portions are in a facing relationship.

Consequently, the positioning of discs 51 and 52 can be adjusted. The discs are attached to shafts 53 and 54, respectively, to which are attached sprockets 55 and 56, respectively (FIGS. 1, 3 and 5). Shafts 53 and 54 are pivotally mounted within the end portions of arms 57 and 58, respectively. The arms are pivotally mounted about vertically extending trunions 59 and 60 which are secured to the frame of the machine. Extending through the trunions are shafts 61 and 62 to which are secured sprockets 63 and 64, respectively. By means of drive chain 65, sprocket 63 is adapted to drive sprocket 55 while chain 66, in response to the drive of sprocket 63, rotates sprocket 56. Adjustable idler sprockets 67 and 68 enable chains 65 and 66 to be properly tensioned.

Arms 57 and 58 are secured in a predetermined radial position at which the clearance between flat portions 51a and 52a is sufficient to pass a book. The setting of a predetermined radial position of the arms is made by means of rods 69 and 70 which extend through arms 57 and 58, respectively. Each of the rods which pass freely through a corresponding opening in each of the arms are provided with collars 71. By means of springs 72 retained by nuts 73, the arms are biased toward collars 71. Rods 69 and 70 are provided with rod ends 74 and 75, respectively, which are pivotally attached to the frame of the machine. By disengaging lock nut 76, the rods which are threadedly engaged to the rod ends can be rotated in order to change the position of arms 57 and 58. During adjustment, springs 72 urge the arms into engagement with collars 71. The positioning of nuts 73 on the rods determines the preload of springs 72 which determine the load at which the arms are deflected away from one another if a book is caught between the turning discs.

As shown in FIG. 5, shafts 61 and 62 are provided with bevel gears 77 and 78, respectively, which are engaged with bevel gears 79 and 80 mounted upon shaft 81. Sprocket 49 which is driven by sprocket 45 through chain 48 is mounted together with sprocket 82 on sleeve 83 of over-running clutch 84 (FIG. 4). Torque transmitted to sprocket 49 can be transmitted by overrunning clutch 84 to shaft 86. In this way shaft 86 is rotated in the direction of the arrow in FIG. 4.

The drive to sprocket 49 which is in synchronism or in a predetermined phase relationship with the drive of the gatherer is transmitted by sprocket 82, adjacent to sprocket 49, and thereby to chain 87 which engages sprocket 88 mounted upon shaft 81 (FIGS. 5 and 7). Sprocket 88 drives shaft 81 and thereby timing discs 51 and 52 which are coupled with shaft 81 by chains and bevel gears. As a result the rotation of the timing discs is in synchronism or is in a predetermined phase relationship with the drive of the gatherer.

Figure 12:
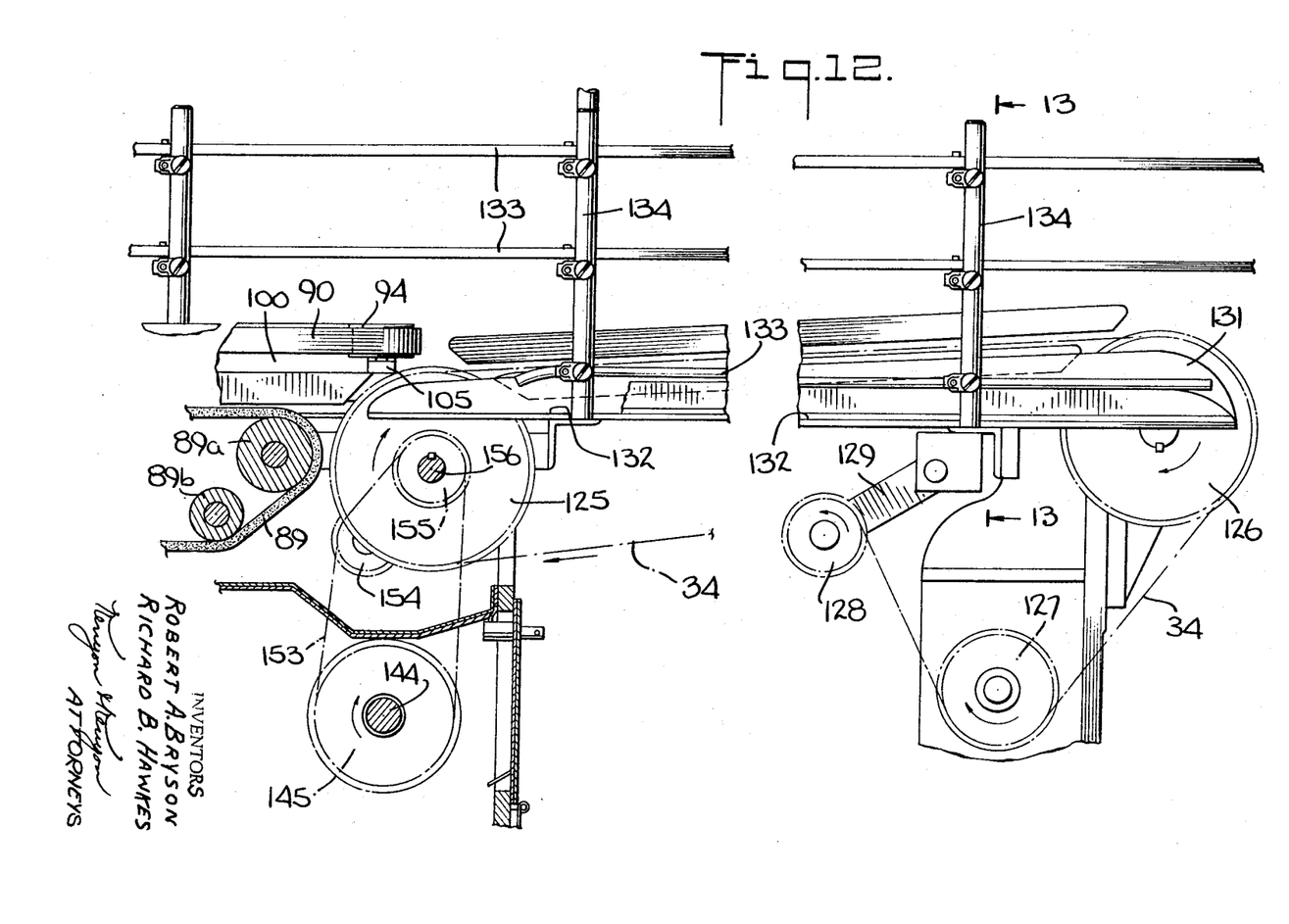
FIG. 12 is a fragmentary vertical section view of the drive of the second advancing apparatus shown adjacent to the exit portion of the transfer machine.

The means for conveying the article or book through the transfer machine includes bottom conveyor belt 89 and side conveyor belts 90 (FIGS. 1–4). The drive to belt 89 for moving it in the direction of the arrow in FIG. 3 is provided by pulley 91 (FIG. 4) attached to shaft 86. Belt 89 is supported by idler rollers 89a and 89b (FIG. 12). Conveyor belts 90 are each driven by pulleys 92 about idler pulleys 93–96 (FIG. 3). Teeth 92a of pulley 92 are engaged in teeth formed in side conveyor belts 90 in order to drive them (FIG. 1). Each of pulleys 92 is attached to a different one of shafts 97 which are provided with bevel gears 98 (FIG. 4). In turn bevel gears 99 mounted upon shaft 86 are engaged with bevel gears 98 in order to provide the drive from shaft 86 to pulleys 92. Bevel gears 99 are slidably mounted upon shaft 86 and secured with respect thereto by means of a key disposed in an axial keyway in shaft 86.

Idler pulleys 93, 94 and 95 are mounted with respect to flange 100 which extends vertically from plate 101 (FIGS. 3, 4 and 5). Plate 101 in turn is supported by base plate 102 which is mounted upon the machine frame. Slots 103 in plates 101 receive cap screws 104 which retain plate 101 in position on base plate 102 while permitting lateral relative motion with respect thereto. Each of idler pulleys 93 and 94 are pivotally mounted upon brackets 105 which are attached to shafts 106 extending through openings in flange 100. Springs 107 urge the brackets toward the center line of the machine until shafts 106 are advanced to a position where adjustment stop screws 108 abut flange 100.

Idler pulleys 96 which are pivotally mounted on arms 109 serve to maintain tension in belts 90 so that the teeth of the belts remain engaged with teeth 92a of pulleys 92. One end of each arm 109 is pivotally mounted by screw 110 to flange 100. The other end of each arm adjacent to the pulley is pivotally connected to threaded shaft 111 which is adjustably positioned with respect to rod end 112 that is pivotally attached to flange 100. When rod 111 is adjusted and secured by nut 113, spring 114 serves to urge arm 109 toward the belt in order to apply tension to the belt through pulley 96.

Whenever the thickness of the book to be advanced by the transfer machine changes, it is necessary to adjust the interval in the lateral direction between side belts 90. In order to accomplish this plate 101 adjacent to the front of the machine and shown in the bottom portion of FIG. 3 is provided with threaded blocks 115 through which threaded shafts 116 extend. Sprockets 117 are attached to the threaded shafts and chain 118 is disposed about them. Idler sprocket 119 serves to set the tension in chain 118. Upon rotation of hand wheel 120 (FIG. 1) which is attached to one of shafts 116, shafts 116 rotate and due to the threaded engagement with blocks 115, plate 101 is moved in a lateral direction with respect to base plate 102. Since plate 101 carries the assembly including side belt 90, the side belt shown in the lower portion of FIG. 3 can be adjustably positioned with respect to the other side belt and thereby set the interval between them.

Adjustments of side belt 90 in the upper portion of FIG. 3 can be made in a similar manner by means of threaded studs 121 which engage blocks 122. This arrangement enables belt 90 in the upper portion of FIG. 3 to be positioned with respect to a predetermined reference line extending through the transfer machine parallel to the line of travel therein.

The second advancing apparatus, the conveyor of the binder, as shown in FIGS. 1, 12 and 13 includes conveyor chain 34 to which are attached pins 35. Chain 34 is disposed about sprockets 35, 126 and 127. Idler sprocket 128 which is pivotally supported on arm 129 is adjusted to maintain tension in chain 34. During operation it is necessary that each book being discharged by the transfer machine from side belts 90 and bottom belt 89 be in a second predetermined phase relationship with chain 34 and pins 35 thereon of the binder. Upon leaving the belts of the transfer machine the lower portion of the book enters between side plates 130 and 131 as the book rests upon support plate 132 (FIG. 13). The remaining portions of the book are supported by a plurality of side rails 133 which are supported by uprights 134. The chain and the pins are guided in an upward direction between sprockets 125 and 126 by tracks 135.

Power for driving conveyor chain 34 is transmitted from the binder to sprocket 136 (FIG. 8) which is connected by clutch 137 to shaft 138 of angle drive 139. Output shaft 140 of the angle drive is coupled to double sprocket 141 which engages chains 142. After passing about idler sprockets 142a, chains 142 engage sprockets 143 which are attached to shaft 144. Sprocket 145 is coupled to shaft 144 by overload clutch 146 which is shown in its operating condition in FIG. 8. During an overload condition, sprocket 145 cams ball 147 which is biased toward the sprocket by spring 148. Movement of ball 147 away from sprocket 145 is transmitted by rod 149, disc 150 and rod 151 to switch 152 which senses the overload condition.

As shown in FIG. 12, sprocket 145 drives chain 153 which passes about idler pulley 154 and engages sprocket 155 attached to shaft 156 upon which sprocket 125 is mounted. Since shaft 144 is driven from the binder, the rotation of shaft 144 is a predetermined function of the operation of the binder. Shaft 144 is connected by coupling 157 to pinion 158 (FIGS. 2 and 8). Gear 159 which is connected by coupling 160 to shaft 161 is driven by pinion 158. Attached to shaft 161 there is a portion of the means for varying the operation of the driving means to enable the book or article to be delivered by the conveying means to the second advancing apparatus or binder in a second predetermined phase relationship therewith. The varying means or cam means, that is cam assembly 162, is driven by shaft 161. Driving cam assembly 162 includes side plates 163 and 164 which have radially extending arms 163a and 164a, respectively (FIGS. 2, 8 and 9–11). Side plates 163 and 164 are mounted upon hub 165 which is attached to shaft 161. The surfaces of arms 163a and 164a which face one another are relieved to receive shoes 166 adjacent to side plate 164 and rollers 167 adjacent to side plate 163. Bolts 168 extending through the side plates, the shoe and the roller serve to clamp the side plates against the shoe and roller. Each of shoes 166 is provided with cam surfaces 169 which extend in a tangential manner in the direction of rotation of the side plates. The drive to cam assembly 162 is conditioned so that one of the arms of the cam assembly pass a given point for each passage of one of pins 35 on conveyor chain 34 of the binder.

The remaining drive to the means for varying the operation of the driving means for the conveying device of the transfer machine includes chain 87 which passes over idler 170 and then engages sprocket 171 (FIGS. 7 and 8). Sprocket 171 is mounted upon hub 172 of coupling 173 which has jaw portion 174, the included angle of which is approximately 180° (FIG. 8). Coupling 173 is pivotally mounted with respect to shaft 175 by bushing 176. Dog 177 which is secured to shaft 175 by key 178 is wedge-shaped with an acute included angle and is adapted to engage jaw portion 174. Helical spring 179 disposed about shaft 175 is anchored to the shaft by a turn of the spring engaged with pin 180. At the other end of the spring, a turn of it is anchored to pin 181 extending from hub 172. If sprocket 171 and consequently hub 172 are considered, by way of explanation, to be held stationary, spring 179 biases shaft 175 in a clockwise direction as viewed in FIG. 7, the clockwise direction being opposite to the normal direction of rotation of shaft 175.

When sprocket 171 is rotated in a counter-clockwise direction, as viewed in FIG. 7, and jaw portion 174 drives dog 177, sprocket 171 and shaft 175 are in a predetermined reference position which relates the drive from the gatherer to shaft 175. As a result, any movement of dog 177 in a counter-clockwise direction and with a velocity which causes it to disengage from jaw portion 174, constitutes a departure of shaft 175 from the reference position. In this way dog 177 serves as means for providing lost motion between cam assembly 162 and sprocket 171.

The cam means adapted to engage cam assembly 162, that is cam assembly 182, is pivotally mounted by bushing 183 on shaft 175 (FIG. 8). Cam assembly 182 includes plate cams 184 and 185 which are separated by spacer 186 and mounted upon hub 187. Cams 184 and 185 include a plurality of lobes 184a and 185a respectively which have converging cam surfaces 184b and 185b respectively (FIGS. 2 and 9–11). Plate cam 184 is displaced in a counter-clockwise direction (as viewed in the drawings) from plate cam 185 so that lobes 184a are shifted in a counter-clockwise direction from lobes 185a.

Hub 187 is provided with notch or opening 187a which receives dog 188 of coupling 189 attached by key 190 to shaft 175. Cam assembly 182 is coupled to shaft 175 by spring 191 of the helical type which engages pin 192 mounted upon plate cam 184 and pin 193 secured to the shaft. When viewing cam assembly 182 in FIGS. 2 and 9–11 and when considering shaft 175 to be held stationary by way of explanation, spring 191 biases cam assembly 182 in a clockwise direction. Thus dog 188 serves as a means for providing lost motion to cam assembly 182.

Adjacent the end of shaft 175 opposite to which sprocket 171 is attached, there is mounted sprocket 194 (FIGS. 2, 6 and 8). Sprocket 194 drives chain 195 which passes over idler 196 (FIGS. 2 and 6) and engages sprocket 197 (FIGS. 2 and 8). Sprocket 197 is attached to hub 198 which is pivotally mounted with respect to shaft 199. Electric clutch 200 attached to shaft 199 when energized engages with hub 198 so that the drive to sprocket 197 is transmitted to shaft 199.

Sprocket 201 is mounted upon outer portion 202a of over-running clutch 202 which has its inner portion 202b secured by key 203 to shaft 199. Over-running clutch 202 is adapted to transmit drive to sprocket 201 when shaft 199 is rotated in a clock-wise direction as viewed in FIGS. 2 and 6. Consequently, clutch 202 serves as a unidirectional means which prevents a counter-clockwise movement from being transmitted to sprocket 201. Sprocket 201 is coupled to sprocket 204 attached to shaft 86 (FIGS. 2 and 4) by chain 205 which passes over idler 206 (FIG. 7). Thus the drive of cam assembly 182 to sprocket 204 is adapted to rotate shaft 86 and thereby drive transfer conveyor belts 89 and 90. When the angular velocity applied to sprocket 204 exceeds the angular velocity applied to shaft 86 by sprocket 49, over-running clutch 84 enables sprocket 204 to accelerate shaft 86. When the angular velocity applied to sprocket 204 is substantially equal to that applied to sprocket 49, the drive of shaft 86 remains under the control of sprocket 49.

As shown in FIG. 3, switch 208 is mounted upon support 209. Operating rod 210 of the switch engages arm 211 which is pivotally mounted with respect to support 209. At the end of the arm opposite to its pivotal support there is provided roller follower 212 which is positioned adjacent to the path travel between side belts 90. Upon the movement of a book by belts 89 and 90 to a point at which it engages follower 212, arm 211 is deflected away from the path of travel and, by moving rod 210, closes the normally opened contacts of switch 208. Stops 213 are positioned adjacent to arm 211 to limit its magnitude of travel. As shown in FIG. 6, switch 208 is connected to brush contact 214 by lead 215. Switch 208 when closed by the engagement of a book with follower 212 connects clutch 200 to a power source so that it can be energized through brush 214.

Cam 43 mounted upon shaft 40 contains lobe 43a which is adapted to engage roller follower 216 of normally opened switch 217 and closes it. Switch 217 when closed energizes clutch 200 by means of lead 218 connected to brush contact 214. Thus it can be seen that clutch 200 can be energized by the closing of normally open switch 208 or the closing of the normally open condition of switch 217.

As shown in FIGS. 6 13 and 14, the presence of a book along the end portion of chain 24 of the gatherer as well as along transfer machine 25 is sensed by engagement of the book with rail 219 which is pivotally supported by links 220 to uprights 29 and 134. One of uprights 29 can be provided with switch 221 having actuating rod 222 adjacent to the path of travel of link 220 (FIG. 14). With this arrangement elevation of rail 219 by engagement with a book causes link 220 adjacent to switch 221 to swing upwardly thereby releasing actuating rod 222 which operates the switch. Pins 223 adjacent to links 220 limit the downward movement of rail 219 by engaging the links.

*Operation*

In the gatherer signatures are collated to make up a book in front of each of pins 23 of conveyor chain 24. The resulting books are advanced by the chain toward transfer machine 25. Following the gathering operation it is necessary to deliver the books to infeed chain 34 of the binder which is provided with pins 35. During jogging, starting up, and stopping of the gatherer, the gatherer and binder are not coupled to one another and consequently are not necessarily synchronized with one another. Thus the gatherer and binder conveyors do not necessarily move at the same speed or are they necessarily in a corresponding phase relationship with one another. The transfer machine of the invention enables the books to be moved from the gatherer to the binder in the proper predetermined phase relationship.

The transfer machine is provided with conveyor belts 89 and 90 for moving the books from the gatherer to the binder. In order to deliver each book in the proper phase relationship to the pins on the conveyor chain of the binder it is necessary for the conveyor belts of the transfer machine to be operated in response to any departure of the phase relationship of the gatherer and binder from a predetermined one in which the gatherer and binder are synchronized. In order to accomplish this the transfer machine requires inputs which reflect the operation of both the gatherer and the binder.

The gatherer input or the motion of gatherer conveyor chain 24 rotates sprocket 36 (FIG. 14). The rotation of sprocket 36 is transmitted by sprocket 38 to sprocket 40 and clutch 44. When energized clutch 44 drives sprocket 45 which drives spcoket 49 (FIGS. 4 and 7) by means of chain 48. Sprocket 82 rotates with sprocket 49 and drives chain 87 engaged with sprocket 88 mounted upon shaft 81 (FIG. 7). In turn shaft 81 by means of gears and chains operates timing discs 51 and 52 which are the means for admitting the article from the gatherer conveyor chain to the conveying means or belts 89 and 90 of transfer machine 25. Thus the timing discs are operated in a predetermined phase relationship with the gatherer input. With a book disposed between the rounded portion of each of the discs, the discs roll with respect to the book as the discs are rotated and advance the book. Whenever the timing discs are rotated to a position in which the flat portions thereof are in a facing relationship, a book can be admitted, that is released from engagement with the discs and passed into the transfer machine. In this way the books can be admitted in a timed relationship with the gatherer input.

In addition to driving the timing discs, chain 87 drives sprocket 171 attached to hub 172 which is mounted upon shaft 175. The engagement of jaw portion 174 of coupling 173 with dog 177 attached to shaft 175 serves to define a reference position between the gatherer input, as transmitted to sprocket 177, with respect to shaft 175. Cam assembly 182 is positioned with respect to shaft 175 by the engagement of notch 187a of hub 187 with dog 188 which is keyed to the shaft.

Figures 10, 11:
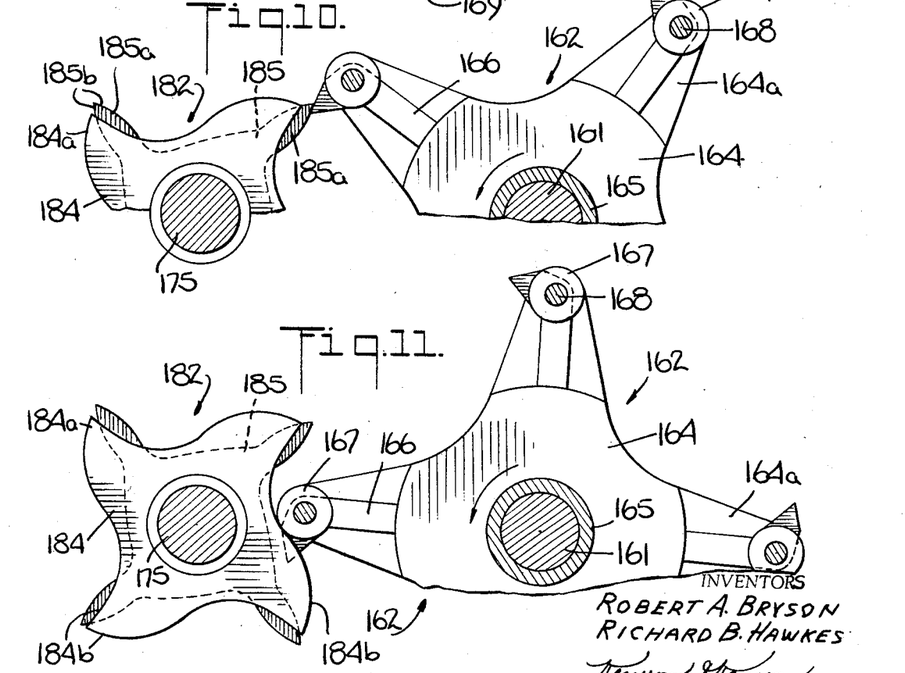
FIG. 10 is a fragmentary vertical section view showing the cam assembly reversing the follower assembly in a relative sense when the first advancing apparatus is in a leading phase relationship with the second advancing apparatus.
FIG. 11 is a fragmentary vertical section view showing the cam assembly rotating the follower assembly when the first and second advancing apparatus have been driven substantially into phase.

Cam assembly 182, as shown in FIGS. 9–11, is formed from two plate cams 184 and 185, each having an equal number of lobes 184a and 185a, respectively, which are positioned substantially adjacent to one another. Each lobe of the cam assembly corresponds to a cycle of operation of the transfer machine, that is, the transferring of a book from the gatherer to the binder. As a result, upon selecting the number of lobes, the drive from the gatherer input to cam assembly 182 is conditioned so that the movement of one lobe corresponds to one cycle of operation of the transfer machine. In this way, the input motion from the gatherer is coupled by cam assembly 182 to the transfer machine.

The binder drives sprocket 136 which is connected to angle drive 139 (FIG. 8). The output of the angle drive is connected by sprocket 141 and chains 142 to sprockets 143 coupled to shaft 144. The motion of shaft 144 is then transmitted by pinion 158 and gear 159 to shaft 161 upon which is mounted cam assembly 162.

Cam assembly 162 includes side plates 163 and 164 having a plurality of arms 163a and 164a, respectively. The number of arms correspond to the number of lobes of cam assembly 182. The inner surface of the side plates are relieved to receive shoes 166 and rollers 167 at each of the arms of the assembly. As shown in FIG. 8, rollers 167 are disposed in a plane extending through the plane of plate cam 184 while shoes 166 are disposed in a plane which extends through plate cam 185. In this way cam assembly 162 serves as the input of the binder into the transfer machine. Similarly as in the case of cam assembly 182, cam assembly 162 is rotated in a ratio established by the various sprockets and gears such that the motion of each of the arms of the assembly correspond to a cycle of operation of the transfer machine.

At this point it can be seen that cam assemblies 182 and 162 serve to measure or indicate the phase relationship between the gatherer input and the binder input, respectively. When the gatherer and binder are operating in a predetermined phase relationship, a book can pass from pin 23 on the gatherer chain, through the conveyor belts on the transfer machine, and enter directly in synchronism with pin 35 on chain 34 of the binder. The inputs of the gatherer and the binder under such a condition are in phase and, as a result, the relative position of cam assembly 162 and 182 is analogous to two gears in mesh where the lobes of cam assembly 182 correspond to gear teeth and the arms of cam assembly 162 correspond to gear teeth. The two cam assemblies in the in-phase condition can operate in the direction of the arrows in FIGS. 9–11 without the transfer of torque therebetween. Thus the two cam assemblies operate as unloaded gears running in mesh with one another. In this condition, sprocket 45 by means of chain 48 rotates sprocket 49 which by means of overrunning clutch 84, rotates shaft 86 in the direction shown by the arrow in FIGS. 4 and 7.

If, during starting, jogging or stopping of the gatherer, the phase relationship of the gatherer with respect to the binder should become a lagging one, that is the gatherer is delivering the books in a somewhat late manner, the relationship of the cam assemblies would be that of FIG. 9. Thus instead of rotating substantially in mesh and without the transfer of torque, FIG. 9 shows the condition where the lagging cam assembly 182 is intersected by cam assembly 162 with the cam surface 169 of shoe 165 intersecting cam surface 185b of lobe 185a. Due to the greater tangential velocity of shoe 166 as compared to lobe 185a as a result of the greater radial length of the arms of cam assembly 162 as compared to the radial length of the lobes of cam assembly 182, the engagement between the shoe and the lobe will result in the lobe being accelerated in an angular manner. The relationship of the radial links as well as the profile of the shoes and lobes determine the characteristic of the accelerating motion. In this way, cam assembly 182 is accelerated in a clockwise direction as viewed in FIG. 9. As cam surface 169 of the shoe slides along lobe 185a having cam surface 185b, cam assembly 182 is rotated and subsequently roller 167 engages cam surface 184b of lobe 184a. Thus a transition from the drive by the shoe is passed on to the drive by the roller. With this arrangement it can be seen that the combination of the shoes and rollers of cam assembly 162 having cam surfaces into parallel adjacent planes, and the parallel and adjacent plate cams of cam assembly 182 engaged therewith enble shaft 175 to be accelerated with a predetermined characteristic which is dependent upon the phase relationship of the two cam assemblies.

The angular acceleration applied to cam assembly 182 accelerates shaft 175 and thereby sprocket 194 (FIG. 8). Sprocket 194 drives sprocket 197 which is coupled by clutch 200 to shaft 199 when the clutch is electrically energized. Shaft 199 drives sprocket 201 by means of overrunning clutch 202 and in turn sprocket 201 drives chain 205 (FIG. 7) which passes about sprocket 204 on shaft 86. As a result shaft 86 is accelerated, thereby accelerating belts 89 and 90 of the transfer machine. Over-running clutch 84 at this point enables shaft 86 to be accelerated free of the drive from the gatherer to sprocket 49.

FIG. 11 shows roller 167 moving along cam surface 184b of lobe 184a. As the roller and cam surface pass out of engagement with respect to one another, torque is no longer transmitted to plate cam 184. During the time that a clockwise motion is imparted to cam assembly 182 by cam assembly 162, shaft 175 as viewed in FIG. 9 is rotated clockwise with respect to the normal position in which jaw portion 174 engages dog 177. Thus the dog is advanced with respect to the jaw portion and this relative motion serves to load the spring 179 in a torsional manner. Therefore upon disengagement of roller 167 with plate cam 184, following the engagement shown in FIG. 11, the removal of the load upon plate cam 184 enables spring 179 to rotate shaft 175 back to the normal reference position in which jaw portion 174 engages dog 177 and transmits drive to shaft 175. At this point if the lagging relationship of the gatherer remains, the cycle of operation whereby cam assembly 182 is accelerated in a clockwise direction, as viewed in FIGS. 9 and 11, is repeated until the normal predetermined phase relationship is restored.

FIG. 10 shows the condition in which cam assembly 182 and therefore the gatherer input is leading the binder input reflected by cam assembly 162. As a result cam surface 169 of shoe 166 passes beneath lobe 185a as shown in FIG. 10 and upon further motion urges cam assembly 182 to move in a counter-clockwise direction. Upon this reversed motion, notch 187a disengages with respect to dog 188 and spring 191 is loaded in a torsional manner. Any tendency to transmit a reversal in torque through shaft 175, sprocket 194, and sprocket 197 is blocked by the unidirectional drive characteristic of dog 188 and notch 187a. Thus sprocket 194 cannot transfer any reversal motion through sprockets 197 and 201 to sprocket 204 and thereby shaft 86.

As shoe 166 passes along cam 185, the reversal motion terminates and roller 167 engages cam 184. Upon the termination of the reversal torque, notch 187a, which has been disengaged from dog 188, is forced to reengage the dog by the torsional force of spring 191. In this way cam assembly 182 assumes its normal relative position to shaft 175 with notch 187a engaged with dog 188 and with jaw portion 174 engaged with dog 177. Thus sprocket 171, shaft 175, and cam assembly 182 assume their normal operating position with respect to the gatherer input and as a result cam assembly 182 reflects the phase relationship of the gatherer input which is to be compared with the phase relationship of the binder input. In the manner described the drive to conveyor belts 89 and 90 is varied as long as the phase relationship between the gatherer and binder are different from the predetermined phase relationship of normal steady-state operation.

Release of a book from between timing discs 51 and 52 occurs when cam assembly 162 and follower assembly 182 have reached the "point-to-point" relative position which is the position in which the point or edge between cam surface 169 is in contact with point or edge between cam surfaces 185b. The point-to-point position is also the position which corresponds to the maximum extent that a book can be early or late, that is, lead or lag. If the operation is terminated and the cam and follower assemblies are in the position shown in FIG. 9 in which cam surface 169 is riding over cam surface 185b, a book would be released from between the timing discs. On the other hand, if the relationship of the cam and follower assemblies is that shown in FIG. 10, in which cam surface 169 is riding beneath cam surface 185b, the book would be found to be held by the timing discs.

In FIG. 10 the phase relationship between cam assembly 182 and 162 and therefore the phase relationship between the gatherer input and the binder input is a leading relationship since lobe 185a is shown above shoe 166. In this position, the book has not yet been released by timing discs 51 and 52 and due to the early or leading condition, the book must be delayed before delivery to the binder. The limiting relative position of cam assembly 182 in the lagging or late arrival sense corresponds to the limiting condition at which the transfer machine can still sufficiently accelerate a book and deliver it to the binder chain at the proper time. If the transfer machine is permitted to accelerate a book which is released to the transfer machine under an excessive lag condition, conveyor belts 89 and 90 of the transfer machine may be unable to accelerate the book sufficiently to advance it completely through the transfer machine to the binder.

Cam 43 is mounted on shaft 40 with sprocket 39 which is linked to sprocket 38 mounted upon shaft 37 (FIGS. 6 and 14). Since the gatherer chain 24 engages sprocket 36 attached to shaft 37, cam 43 has a position which relates to that of the gatherer input. An electrical control device, switch 217, has roller follower 216 engaged with the surface of cam 43. Cam 43 is provided with lobe 43a (FIG. 6) which engages follower 216 and closes normally opened switch 217.

Prior to positioning cam 43 on shaft 40, the cam and follower assemblies are brought to the point-to-point position so that the timing discs are entering the release position where the rounded portion of each of the discs breaks contact with the book. Cam 43 is positioned on shaft 40 so that lobe 43a is just ready to pass beyond cam switch 217. Consequently switch 217 breaks just after the point on the cam assembly moves on top of the point on the follower assembly. As a result, at the point-to-point position, switch 217 is still closed. The arcuate length of the lobe is selected as a direct function of the book length. Since switch 217 in its closed condition energizes clutch 200 which provides the drive from cam assembly 182 to sprocket 204 on shaft 86 (FIG. 4), the opening of switch 217 deenergizes clutch 200 and interrupts the drive. As a result the transfer machine does not accelerate and advance the book.

When cam 43 advances to a position at which follower 216 leaves lobe 43a, switch 217 is opened and clutch 200 deenergized. However, clutch 200 can remain energized and therefore engaged if switch 208 is closed by the passage of a book adjacent thereto.

In operation, one book is entering the transfer machine as another book is going out from the machine. In this case, switch 217 is closed and energizes clutch 200 as one book is being advanced by the timing discs. Switch 217 remains closed during the advancing by the discs since lobe 43a has a length which is related to the length of the book. This maintains the connection to clutch 200. In addition to switch 217, switch 208 provides a circuit parallel to that of switch 217 and connected to clutch 200. Consequently, when switch 217 is not closed by lobe 43a, clutch 200 can be energized by the closing of switch 208.

If a book is advancing between conveyor belts 90 of the transfer machine and it is desired to stop, it is of advantage to continue to drive the book from the transfer machine. In such a case the operation would be to accelerate the book regardless of the opening of switch 217 by being beyond lobe 43a of cam 43. The presence of the book within the transfer machine is sensed by the engagement of follower 212 with the book. This engagement closes normally open switch 208 which is connected to clutch 200. With switch 208 closed and even though switch 217 is opened, clutch 200 continues to be energized. Consequently, the accelerating action of the cam assemblies advances the book from the transfer machine toward the binder chain in spite of the fact that cam 43 would normally interrupt the accelerating action at this particular time.

In another situation, a stop may be desired with a book still engaged by the timing discs. Under such a condition, belts 89 and 90 would attempt to drag the book through the discs. Here, switch 208 would be open and at the same time cam 43 would be advanced to the position where switch 217 opens. As a result, clutch 200 would be deenergized and the drive interrupted.

Upon starting the gatherer and binder machines and after operating for a period of time during which the transfer machine delivers the books in the proper phase relationship from the gatherer to the binder, a steady-state operating condition may be obtained at which the gatherer continues to run in a proper phase relationship with the binder. At such a time it is unnecessary for the transfer machine to accelerate the books through it and thus the transfer machine need merely operate as a conveyor. In this mode of operation the drive to timing discs 51 and 52 and the drive to conveyor belts 89 and 90 is that transmitted to sprocket 49 and thereby to sprocket 82 as well as shaft 86. When a synchronized steady state condition has been achieved, the drives to the gatherer and binder can be clutched together so that the books move uniformly through the gatherer, the transfer machine, and the binder. Whenever it is necessary to operate the gatherer without operating the transfer machine such as when initially getting the overall system into operation, the drive to the transfer machine can be terminated by deenergizing clutch 44 which connects sprocket 45 to shaft 40 in the energized condition.

What is claimed is:

1. A machine for receiving an article from an infeed conveyor adapted to advance the article and for delivering the article to an outfeed conveyor adapted to advance the article, the infeed conveyor and the outfeed conveyor operating substantially independent of one another and during the normal operating condition thereof having a first predetermined substantially constant phase relationship between the motion of the infeed conveyor and the motion of the outfeed conveyor, the first predetermined phase relationship substantially corresponding to a condition of synchronism between the infeed conveyor and the outfeed conveyor, said machine enabling the article to be delivered to the outfeed conveyor in a second predetermined phase relationship between the motion of the article being delivered and the motion of the outfeed conveyor, the second predetermined phase relationship enabling the article to be delivered to a predetermined location on the outfeed conveyor, said machine comprising:

(a) means adapted to be disposed between the infeed conveyor and the outfeed conveyor for conveying the article from the infeed conveyor to the outfeed conveyor;

(b) means adapted to be coupled to the infeed conveyor for gating the article from the infeed conveyor to said article conveying means in a third predetermined phase relationship between the motion of gating and the motion of the infeed conveyor, the third predetermined relationship corresponding to the arrival of a predetermined portion of the infeed conveyor to the said gating means;

(c) means adapted to be coupled to the infeed conveyor for driving said article conveying means to convey the article admitted thereto toward the outfeed conveyor; and (d) means connected to said article conveying means, adapted to be coupled to the infeed conveyor and to the outfeed conveyor, and responsive to the magnitude of a lagging phase relationship of the infeed conveyor with respect to the outfeed conveyor which is different than said first predetermined phase relationship for accelerating the operation of said article conveying means to enable the article to be delivered by said article conveying means to the outfeed conveyor in said second predetermined phase relationship therewith.

2. A machine in accordance with claim 1 in which said means for gating the article from the infeed conveyor to said article conveying means comprises:

(a) a pair of pivotally mounted disc members disposed in a common plane adjacent to the infeed conveyor and said article onveying means, said disc members being spaced apart from one another with the path of travel of the article from the infeed conveyor to said article conpeying means extending therebetween, the spacing between the disc members being less than the thickness of the article so that the disc members can block the movement of the article from the infeed conveyor to said article conveying means, each of said disc members having a relieved portion, and (b) means for rotating said pivotally mounted disc members to bring said relieved portions into a facing relationship in accordance with a third predetermined phase relationship with the first advancing apparatus, said disc members in said facing relationship admitting the article from the infeed conveyor to said article conveying means.

3. A machine in accordance with claim 2, in which said means for accelerating the operation of said article conveying means comprises:
   (a) cam means adapted to be coupled to the infeed conveyor and coupled to said article conveying means for varying the operation thereof; and
   (b) additional cam means disposed adjacent to said cam means and adapted to operate in synchronism with the outfeed conveyor for actuating said cam means, the function of the angular velocity imparted by said additional cam means to said cam means when engaged therewith being dependent upon a phase relationship between said additional cam means and said cam means which is different than a fourth predetermined phase relationship therebetween, said fourth predetermined phase relationship being that occurring when said infeed conveyor and said outfeed conveyor are in a condition of synchronism, whereby the operation of said driving means can be accelerated by said cam means to enable the article to be delivered by said article conveying means to the outfeed conveyor in said second predetermined phase relationship therewith.

4. A machine in accordance with claim 3 in which
   (a) said cam means has at least one lobe extending for a predetermined radial length,
   (b) and in which said additional cam means is disposed adjacent to said cam means and operates in synchronism with the outfeed conveyor, said additional cam means having at least one additional lobe extending for an additional predetermined radial length which is greater than that of the lobe of said cam means, the difference in the radial length of said lobe and said additional lobe enabling a function of the angular velocity of said additional cam means to be imparted to said cam means when said additional lobe and said lobe are engaged, said function being dependent upon the fourth predetermined phase relationship between said additional cam means and said cam means, said fourth predetermined phase relationship corresponding to the magnitude of departure from said first predetermined phase relationship, whereby the operation of said article conveying means is varied by said cam means to enable the article to be delivered by said article conveying means to the outfeed conveyor in said second predetermined phase relationship therewith.

5. A machine in accordance with claim 4:
   (a) in which said lobe has substantially convex surfaces extending opposite to one another and converging in an outwardly extending radial direction, and
   (b) in which said additional lobe extends for an additional predetermined radial length which is greater than that of the lobe of said cam means, the difference in the radial length of said lobe and said additional lobe and the profiles thereof enabling a function of the angular velocity of said additional cam means to be imparted to said cam means when said additional lobe and said lobe are engaged, said function being dependent upon a fourth predetermined phase relationship between said additional cam means and said cam means, said fourth predetermined phase relationship corresponding to the magnitude of departure from said first predetermined phase relationship whereby the operation of said article conveying means is varied by said cam means to enable the article to be delivered by said article conveying means to the outfeed conveyor in said second predetermined phase relationship therewith.

6. A machine in accordance with claim 3:
   (a) in which said cam means has at least one lobe extending for a predetermined length, and
   (b) in which additional cam member having at least one additional lobe extending tangentially from said additional cam means at an additional predetermined length which is greater than said predetermined radial length, said additional lobe extending in the direction of rotation of said pivotally mounted additional cam means and having oppositely disposed surfaces converging in said direction, the engagement of said additional lobe and said lobe enabling a function of the angular velocity of said additional cam means to be imparted to said cam means and to said driving means coupled thereto, said function being dependent upon a fourth predetermined phase relationship between said additional cam member and said cam member, said fourth predetermined phase relationship corresponding to the magnitude of departure from said first predetermined phase relationship, whereby the operation of said article conveying means is varied said cam means to enable the article to be delivered by said article conveying means to the outfeed conveyor in said second predetermined phase relationship therewith.

7. A machine in accordance with claim 3 and further comprising means for coupling said driving means to said article conveying means with a degree of lost motion with respect thereto.

8. A machine in accordance with claim 7 in which said means for coupling said driving means with a degree of lost motion with respect thereto comprises a resiliently biased dog means.

9. A machine in accordance with claim 8 in which:
   (a) said cam means comprises a plate cam connected to said resiliently biased dog means and having at least one lobe disposed to each of two parallel planes adjacent to one another, said lobes being angularly offset from one another, additional resiliently biased dog means for coupling said plate cam to said driving means to transmit a motion from said plate cam to said conveying means, and;
   (b) said additional cam means comprises a cam member coupled to the second advancing apparatus for interacting with said plate cam, said cam member including a shoe element disposed in a plane common to that of one of the planes of the lobes of said plate cam and a roller element disposed in another plane common to that of the other plane of the lobes of said plate cam, one of said shoe elements and said roller elements being adapted to engage one of said lobes at a given time to transmit motion from said cam member to said plate cam, whereby the engagement of the forms of said plate cam and said cam member and the phase relationship between said plate cam and said cam member corresponding to the difference from said first predetermined phase relationship accelerate the operation of said driving means.

10. A machine in accordance with claim 1 in which:
    (a) said cam means comprises a pivotally supported cam member coupled to said article conveying means and adapted to be coupled to the infeed conveyor; said cam member having at least one lobe of predetermined profile and
    (b) in which said additional cam means comprises:
      an additional pivotally supported cam member disposed adjacent to said cam member and being adapted to be coupled to and operate in synchronism with the outfeed conveyor, said additional cam member having at least one lobe of an additional predetermined profile, the engagement of said additional lobe and said lobe enabling a function of the angular velocity of said additional cam member to be imparted to said member and to said article conveying means coupled thereto, said function being dependent upon said fourth predetermined phase relationship between said additional cam member and said cam member, said fourth predetermined phase relationship being that occurring when said infeed conveyor and said outfeed conveyor are in a condition of synchronism, whereby the operation of said driving means is accelerated by said cam member to enable the article to be delivered by said article conveying means to the outfeed conveyor in said second predetermined phase relationship therewith.

11. A machine in accordance with claim 1 and further comprising means responisve to the operation of the infeed conveyor for cyclically disconnecting said article conveying means from the infeed conveyor and said means for accelerating the operation of said article conveying means, whereby the operation of the article conveying means can be prevented.

12. A machine in accordance with claim 11 and further comprising means responsive to the presence of an article within said article conveying means for preventing the interruption of the operation of said article conveying means by said interrupting means, whereby an article within the conveying means is insured of being conveyed therefrom during any given cycle of operation.

13. A machine in accordance with claim 1 and further comprising:
    (a) means for commonly connecting the infeed conveyor, the outfeed conveyor, and said article conveying means when the first predetermined phase relationship is present, and
    (b) means for preventing the operation of said accelerating means when said commonly connecting means is operative.

14. A method for receiving an article from an infeed conveyor and for delivering the article to an outfeed conveyor, the infeed conveyor and the outfeed conveyor operating substantially independent of one another and during the normal operating condition thereof having a first predetermined substantially constant phase relationship between the infeed conveyor and the motion of the outfeed conveyor, the first predetermined phase relationship substantially corresponding to a condition of synchronism between the infeed conveyor and the outfeed conveyor, said method enabling the article to be delivered to the outfeed conveyor in a second predetermined phase relationship between the motion of the article being delivered and the motion of the second advancing apparatus, the second predetermined phase relationship enabling the article to be delivered to a predetermined location on the outfeed conveyor, said method comprising the steps of:
    (a) conveying the article between the infeed conveyor and the outfeed conveyor;
    (b) gating the article from the infeed conveyor to the step of conveying in a third predetermined phase relationship with the motion of the infeed conveyor, the third predetermined phase relationship corresponding to the arrival of a predetermined portion of the infeed conveyor adjacent the location of the gating of the article; and
    (c) accelerating the operation of the step of conveying in response to a phase relationship between the infeed conveyor and the outfeed conveyor which is different than the first predetermined phase relationship to enable the article to be delivered by the conveying means to the outfeed conveyor in the second predetermined phase relationship therewith.

15. A method in accordance with claim 14 and further comprising the step of interrupting the step of conveying the article during each cycle of operation in response to the operation of the infeed conveyor to prevent the conveying of articles which can not be accelerated sufficiently to enable the article to be conveyed to the outfeed conveyor in the second predetermined phase relationship.

16. A method in accordance with claim 15 and further comprising the step of proventing the step of interrupting the conveying of the article when an article is already being conveyed.

References Cited
UNITED STATES PATENTS

| | | | |
|---|---|---|---|
| 2,371,926 | 3/1945 | Schmitt | 198—34 |
| 2,858,007 | 10/1958 | McCain et al. | 198—133 X |
| 3,075,630 | 1/1963 | Fisk | 198—76 |
| 3,155,221 | 11/1964 | Griner | 198—34 |
| 3,162,294 | 12/1964 | Dieter | 198—34 |
| 3,231,063 | 1/1966 | Talbot | 198—34 |

EDWARD A. SROKA, *Primary Examiner.*

M. L. AJEMAN, *Assistant Examiner.*